United States Patent
Wick et al.

(10) Patent No.: US 11,543,272 B2
(45) Date of Patent: Jan. 3, 2023

(54) MAGNETIC FLOW SENSOR

(71) Applicant: McCrometer, Inc., Hemet, CA (US)

(72) Inventors: David Christian Wick, Beaumont, CA (US); Matt Holmes, Winchester, CA (US); Javier Tornero-Guerrero, Perris, CA (US); James Takao Prince, Temecula, CA (US)

(73) Assignee: MCCROMETER, INC., Hemet, CA (US)

(*) Notice: Subject to any disclaimer, the term of this patent is extended or adjusted under 35 U.S.C. 154(b) by 138 days.

(21) Appl. No.: 17/124,783

(22) Filed: Dec. 17, 2020

(65) Prior Publication Data
US 2021/0223075 A1 Jul. 22, 2021

Related U.S. Application Data

(60) Provisional application No. 62/962,602, filed on Jan. 17, 2020.

(51) Int. Cl.
*G01F 1/58* (2006.01)
*G01F 1/24* (2006.01)

(52) U.S. Cl.
CPC ............. *G01F 1/588* (2013.01); *G01F 1/24* (2013.01); *G01F 1/582* (2013.01)

(58) Field of Classification Search
CPC ............. G01F 1/588; G01F 1/24; G01F 1/582
See application file for complete search history.

(56) References Cited

U.S. PATENT DOCUMENTS

| 3,529,591 A | 9/1970 | Schuette |
| 3,824,456 A | 7/1974 | Wiegand |
| 5,708,213 A * | 1/1998 | Batey ............... G01F 1/588 73/861.12 |
| 9,470,563 B1 * | 10/2016 | DeVerse ............ A61B 5/02 |
| 2014/0069206 A1 | 3/2014 | Ayers et al. |

FOREIGN PATENT DOCUMENTS

EP 3538901 A1 9/2019

OTHER PUBLICATIONS

International Searching Authority, Notification of Transmittal of the International Search Report and the Written Opinion of the International Searching Authority, or the Declaration, dated Apr. 12, 2021, pp. 15.

* cited by examiner

*Primary Examiner* — Alexander A Mercado
*Assistant Examiner* — John M Royston
(74) *Attorney, Agent, or Firm* — Ference & Associates LLC

(57) ABSTRACT

An embodiment provides a method for measuring a flow of a fluid using a magnetic flow sensor, including: introducing a magnetic flow sensor into a fluid, wherein the fluid has a flow path, wherein the magnetic flow sensor comprises a coil and metallic field disrupter; positioning the magnetic flow sensor such that a distal end of the magnetic flow sensor is parallel with the flow path of the fluid; and measuring a flow of the fluid by measuring a voltage received from the magnetic flow sensor. Other aspects are described and claimed.

18 Claims, 4 Drawing Sheets

MAGNETIC FLOW SENSOR

CROSS REFERENCE TO RELATED APPLICATION

This application claims priority to U.S. Provisional patent Application Ser. No. 62/962,602, filed on Jan. 17, 2020, and entitled "MAGNETIC FLOW SENSOR," the contents of which are incorporated by reference herein.

FIELD

This application relates generally to flow sensors, and, more particularly, to magnetic flow sensors.

BACKGROUND

Magnetic flow sensors or magnetic flow meter may measure a fluid flow. The fluid flow may be measured by a voltage. The voltage may be induced by a flow of a liquid through a magnetic field. Magnetic flow meters operate via magnetic induction. Magnetic flow meters operate when the fluid passing the sensor is conductive. For example, the conductive fluid may be water containing ions. A magnetic flow sensor may be placed in a flow of a conductive liquid. For example, the sensor may be placed in a pipe carrying the conductive fluid.

BRIEF SUMMARY

In summary, one embodiment provides a method for measuring a flow of a fluid using a magnetic flow sensor, comprising: introducing a magnetic flow sensor into a fluid, wherein the fluid has a flow path, wherein the magnetic flow sensor comprises a coil and metallic field disrupter; positioning the magnetic flow sensor such that a distal end of the magnetic flow sensor is parallel with the flow path of the fluid; and measuring a flow of the fluid by measuring a voltage received from the magnetic flow sensor.

Another embodiment provides a device for measuring a flow of a fluid using a magnetic flow sensor, comprising: a processor; and a memory storing instructions executable by the processor to: introduce a magnetic flow sensor into a fluid, wherein the fluid has a flow path, wherein the magnetic flow sensor comprises a coil and metallic field disrupter; position the magnetic flow sensor such that a distal end of the magnetic flow sensor is parallel with the flow path of the fluid; and measure a flow of the fluid by measuring a voltage received from the magnetic flow sensor.

A further embodiment provides a magnetic flow sensor, comprising: a magnetic flow sensor, wherein the magnetic flow sensor comprises a closed end tubular shape, wherein the coil is located in a distal end of the closed end tubular shape; a coil, wherein the coil has a longitudinal axis and the longitudinal axis is orthogonal to the flow; a metallic field disruptor, wherein the metallic field disrupter comprises a mass of metal on each end of the longitudinal axis of the coil; wherein the magnetic flow sensor is utilized to measure a flow of a fluid the magnetic flow sensor is located within by measuring a voltage produced by the magnetic flow sensor, wherein the voltage is produced by a magnetic field orthogonal to the flow path of the fluid, wherein the magnetic field is created by a plurality of conductive particles in the fluid.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
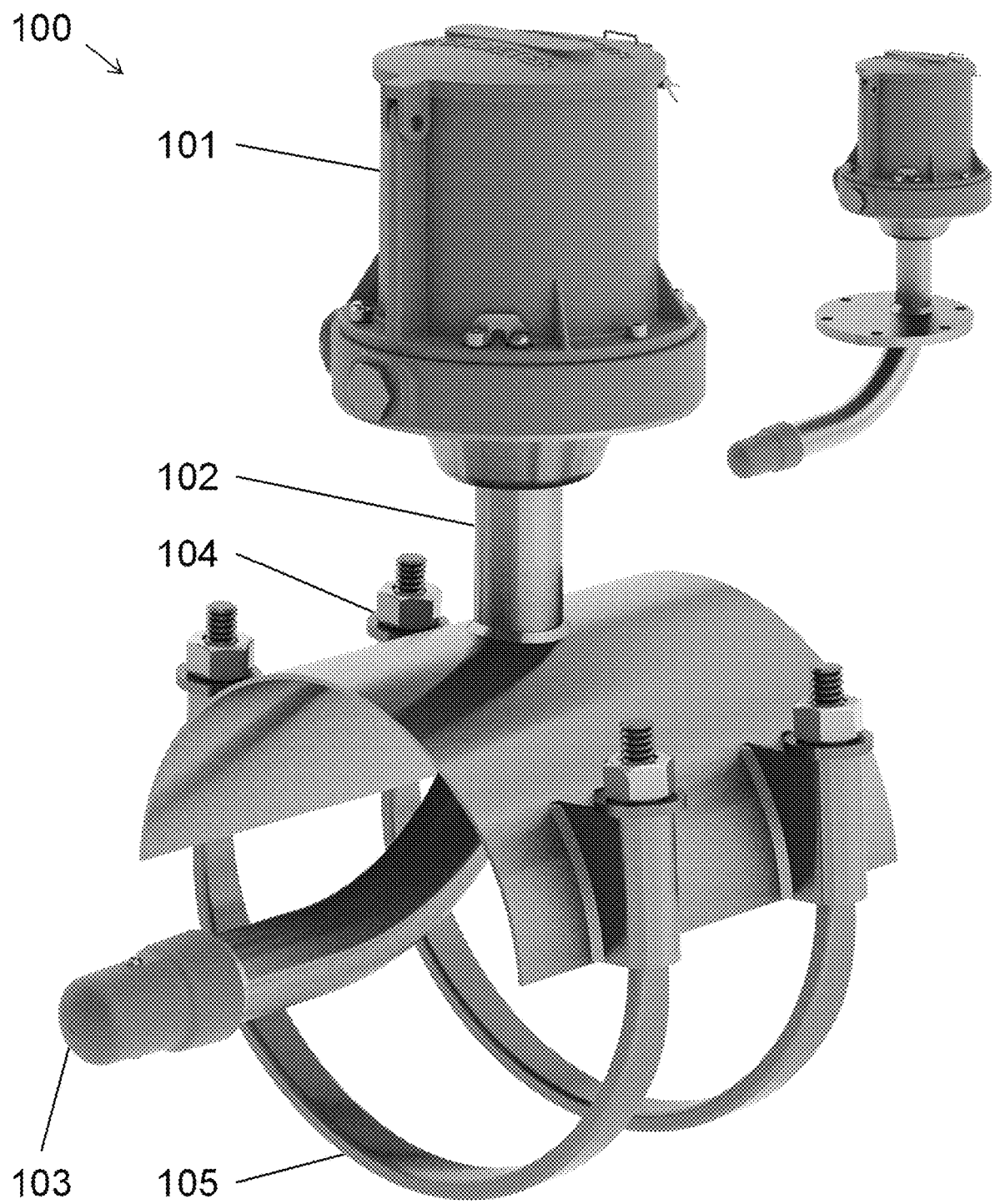
FIG. 1 illustrates an example embodiment of a magnetic flow sensor.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional methods and systems for magnetic flow sensors or mechanical flow sensors may be disrupt the flow of a fluid. Since a flow sensor may be used to determine the flow, the sensor itself may alter a measurement of flow. A conventional insertion type flow sensor may involve placing the sensor in a non-parallel orientation with respect to the flow path. The non-parallel orientation may disrupt the flow. The disruption of flow may be at the point of measurement. The point of measurement may be the most critical point in which a flow may be disrupted by the sensor itself which is meant to measure flow.

Flow sensors may be used in many applications. For example, a sensor may be in a pipe that conveys a fluid. Sensors may also be used in a body of fluid. The fluid flow may be used in industrial, agricultural, environmental, pharmaceutical, food industry, residential settings, or the like.

Replacement and maintenance of flow sensors represent a challenge to a facility. For example, retrofitting a new flow sensor to existing infrastructure may be difficult.

Conventional flow sensors may be produced in many designs. These designs may disrupt flow of a fluid. The design of a flow sensor may require a force from the flowing fluid to impact upon a portion of the sensor. This alters the flow of a fluid. For example, some flow sensors use propeller shaped blades within a flow of a fluid. The propeller moves in response to a flow of liquid, a flow may then be determined by the propeller movement. As another example, a flow sensor may be mechanical. A mechanical sensor may have a mechanism such as a plate at the end of a spring. The flow of a fluid may depress the plate compressing the spring, and a flow may be determined. As another example, a flow sensor may use differential pressure to measure flow. Differential pressure may measure the pressure differential between a tube upstream and a tube downstream of an orifice in the flow of a fluid. The pressure differential may determine the flow of a liquid. While these conventional flow sensors have applicable uses, the conventional approaches disrupt the flow of a fluid either with a physical part or an orifice to create a pressure differential both of which disrupt flow of the fluid. What is needed is a flow sensor that may measure a flow of a fluid with the flow is a state that is as undisrupted as possible.

Accordingly, an embodiment provides a device and method for a magnetic flow sensor. In particular, the magnetic flow sensor may be placed in a position such that the sensor measures an unobstructed flow upstream of any support structure. The unobstructed position allows the sensor to be in a position that reduces or eliminates performance with respect to linearity, accuracy, or the like. The magnetic flow sensor may be retrofitted into existing infrastructure. The magnetic flow sensor may have a clamp to hold the sensor in position. The magnetic flow sensor may be positioned such that the body of the sensor is parallel to a flow of a fluid. In other words, the sensor may point into the flow of a fluid. The orientation of the sensor may allow for less drag or less pressure loss as compared to conventional sensor types. In an embodiment, the sensor may have an overall shape similar to a closed end tubular structure. In an embodiment, the sensor may have a wafer shape. For example, the sensor may have a circular portion and a bisecting portion. The sensor may have a coil. The coil may be located in a distal portion of the sensor. The distal end may be the portion of the sensor located upstream to a flow. The coil may be orthogonal to the flow of a fluid. The coil may have a mass of metal on each end of a longitudinal axis of the coil. The mass of metal may alter the magnetic field of the sensor. The sensor may have an output port. A voltage may be generated by the sensor. The voltage may be proportional or a measurement of the flow of a conductive fluid past the sensor and associated coil.

The illustrated example embodiments will be best understood by reference to the figures. The following description is intended only by way of example, and simply illustrates certain example embodiments.

Referring to FIG. 1, an example device for a magnetic flow sensor 100 is illustrated. The magnetic flow sensor may be positioned in a flow in a parallel orientation such that the sensor measures a flow in an unobstructed position in the flow. In an embodiment, the magnetic flow sensor measures flow using a coil to measure conductive particles in a fluid as they pass the coil. The magnetic flow sensor may generate a voltage. The voltage may be correlated to a flow of a fluid past the sensor.

The magnetic flow sensor may have an external portion 101. The external portion 101 may be a signal converter. The external portion may be a portion of the magnetic flow sensor that may be positioned outside a flow or a "wet" area. For example, the external portion may be located outside of a pipe. The external portion may contain electronic circuitry as discussed below. The external portion may have communication ports, wired connections, wireless communication, or the like for sending or receiving data, power, communication, instructions, or the like to or from the magnetic flow sensor. The external portion may be constructed for a harsh environment. For example, the external portion may be constructed of a durable material such as plastic or non-corroding metal. The external portion may be sealed from liquids and able to withstand a pressure from a flow being measured by the sensor. The external portion may have sealed electrical connections and/or housing seals to protect against dust, liquid, electrical sparks, or the like. The external portion may have access panels. The access panels may be hinged, latched, bolted, or the like for access and closure.

In an embodiment, the magnetic flow sensor may have a conduit 102. The conduit may be located between the external portion 101 and the distal end of the magnetic flow sensor 103. The conduit 102 may locate and support the magnetic flow sensor 103 and/or to provide a conduit path from the magnetic flow sensor 103 to the external portion 101. The distal end is described below and may be oriented such that the distal end is parallel to a flow of a fluid. The conduit may be constructed of a durable, non-corrosive, and/or liquid sealed material. The conduit may be a metal, plastic, or the like. The conduit may be rigid to maintain a position of the distal end in a flow of a liquid. The conduit may be hollow and contain one or more wires for data and/or communication. The conduit may be a bent shape. For example, the conduit may enter a pipe at a right angle with respect to the pipe wall and bend 90 degrees such that the distal end faces a flow of a liquid. In other words, the distal end of the magnetic flow sensor faces upstream to a flow of a fluid and the distal end of the magnetic flow sensor is parallel with the flow path of the fluid. This may allow for accurate flow readings in an undisturbed flow of a fluid. Other configurations are possible with respect to bend angles and radius of the bend. The illustrated conduit is an example embodiment. For example, a bend of the conduit may be altered for pipes of a different diameter.

In an embodiment, the magnetic flow sensor may be clamped onto a pipe or other structure conveying a flow of a fluid. In an embodiment, the magnetic flow sensor may have a clamping plate 104 and one or more clamping U-shaped bolts 105. The clamping plate may fit the outer surface of a pipe. The clamping plate may cover and/or seal an aperture in the pipe. The seal between the clamping plate and the pipe may be a compression seal, welded, bonded, or the like. The conduit may pass through the plate. The conduit may be welded, bonded, or otherwise sealed to the clamping plate.

One advantage of the magnetic flow sensor is that it may be retrofitted to existing infrastructure. Using the illustrated clamping plate, a small aperture may be made in a pipe, the distal end inserted into the pipe and turned towards an upstream flow, and clamped in place. The magnetic flow sensor may be clamped in place using one or more U shaped bolts 105. The clamping plate and U-shape bolts may conform to an outer diameter of a pipe or other vessel of fluid to maintain a position of the magnetic flow sensor. The design of the clamping plate and U-shaped bolts may differ from those illustrated. For example, different configuration may be used for different pipe diameters, different environments, space requirements, or the like.

Figure 2:
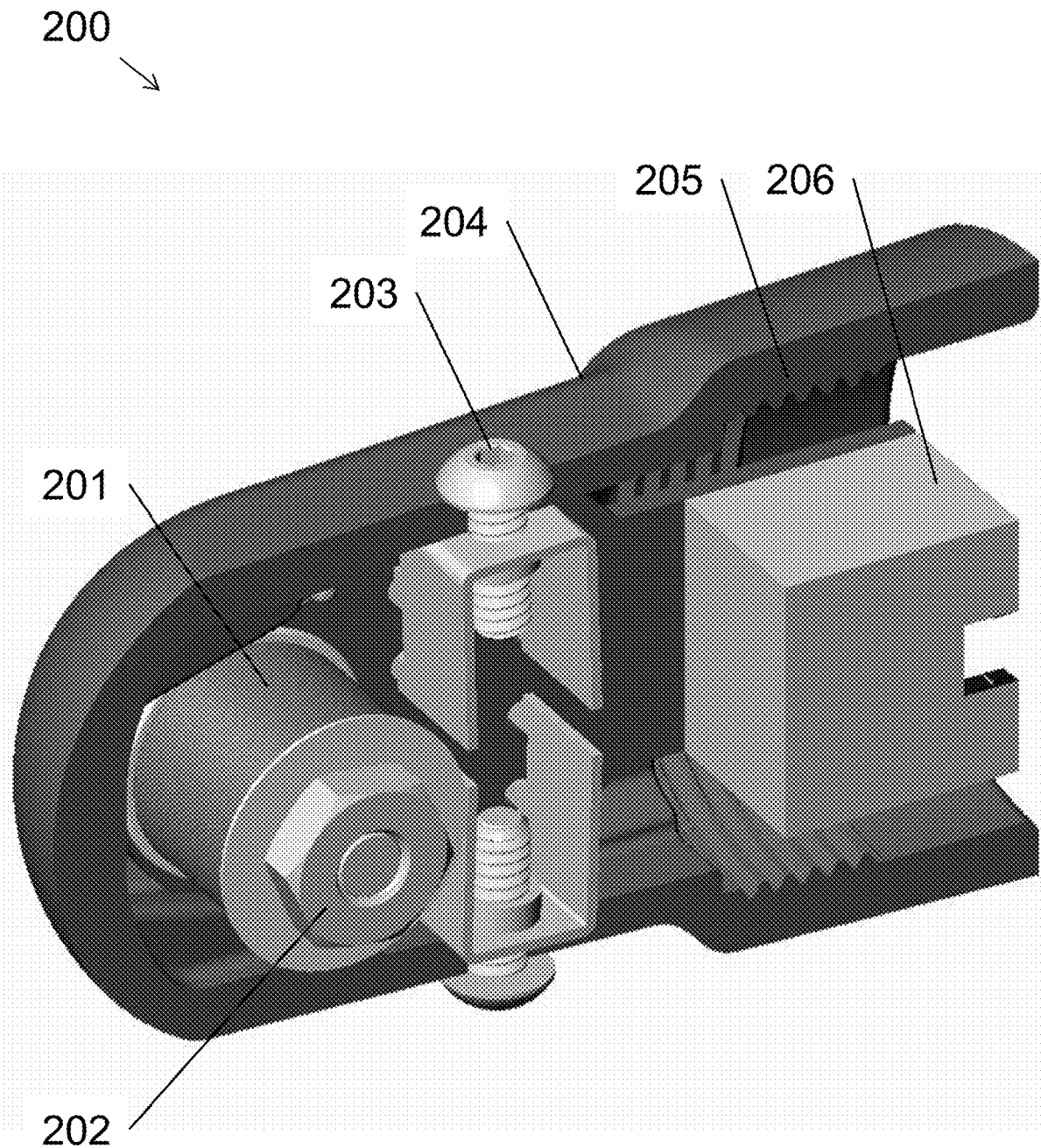
FIG. 2 illustrates an example embodiment of a distal end of a magnetic flow sensor.

Referring to FIG. 2, an example embodiment for a magnetic flow sensor distal end 200 is illustrated. The distal end 200 of FIG. 2 is a side view cutaway of element 103 in FIG. 1. Returning to FIG. 2, the distal end 200 may contain a coil 201. The coil may be a magnetic coil as charged particles of a fluid pass the coil. The coil may have a longitudinal axis. The coil may be oriented within the distal end such that the longitudinal axis is orthogonal to a flow of the fluid. The distal end of the magnetic flow sensor may be position parallel to a flow of a fluid.

In an embodiment, the coil may detect the passage of conductive particles. The conductive particles may be in a fluid flowing past the coil. The magnetic flow sensor may measure a voltage or a voltage change. The voltage may be due to conductive particles in a fluid flowing past the coil. The process may be described by Faraday's Law. A magnetic field may be created orthogonal to the flow of fluid with conductive particle. In an embodiment, a voltage created by the magnetic field acting on conductive particles may be proportional to a velocity of a fluid flow. In an embodiment, the measured voltage may be correlated with a fluid velocity to measure a flow.

In an embodiment, the coil may have one or more metallic field disrupters 202. The one or more metallic field disrupters may be on each end of the longitudinal axis of the coil. The one or more metallic field disrupters may be a mass of metal. For example, the metallic field disrupter may be a nut as illustrated. However, any mass of conductive material may be used. A metallic field disrupter may be a nut, a bolt head, a rivet, a forged or stamped piece of metal, or the like. In an embodiment, the metallic field disruptor may disrupt the magnetic field created by the conductive particles passing the coil. The disruption may improve the sensitivity and/or accuracy of the magnetic flow sensor.

In an embodiment, the magnetic flow sensor distal end may have one or more fasteners 203. The fastener may be a screw, bolt, rivet, or the like. The fastener may hold the distal end housing 204 to the inside components of the distal end. The fastener may pass through the distal end housing and thread or otherwise attach to inner components in the distal end. The fastener may also serve as an electrical connection block for components in the distal end.

The distal end housing may be of a fluid tight and/or durable housing. The distal end housing may be of a material as to not degrade in a particular fluid in which the magnetic flow sensor is immersed. The distal end housing may have a fitment portion 205. In an embodiment, the fitment portion affixes the distal end housing to the conduit. The fitment portion may be threaded, a compression fitting, or the like. The fitment portion may be female such that the flow of fluid passes over the distal end housing and over the first part of the conduit. The fitment portion may be sealed using tape, cement, glue, or the like. The fitment portion may be seal using a removable sealing material to allow service or replacement of a distal end housing and/or components within the distal end housing. In an embodiment, a data and/or communication port or plug 206 may be located at the conduit end of the distal end housing. The port may allow data and/or communication wire to be operatively coupled to the components within the distal end housing, and allow those wires to travel through the conduit to the external portion.

Figure 3:
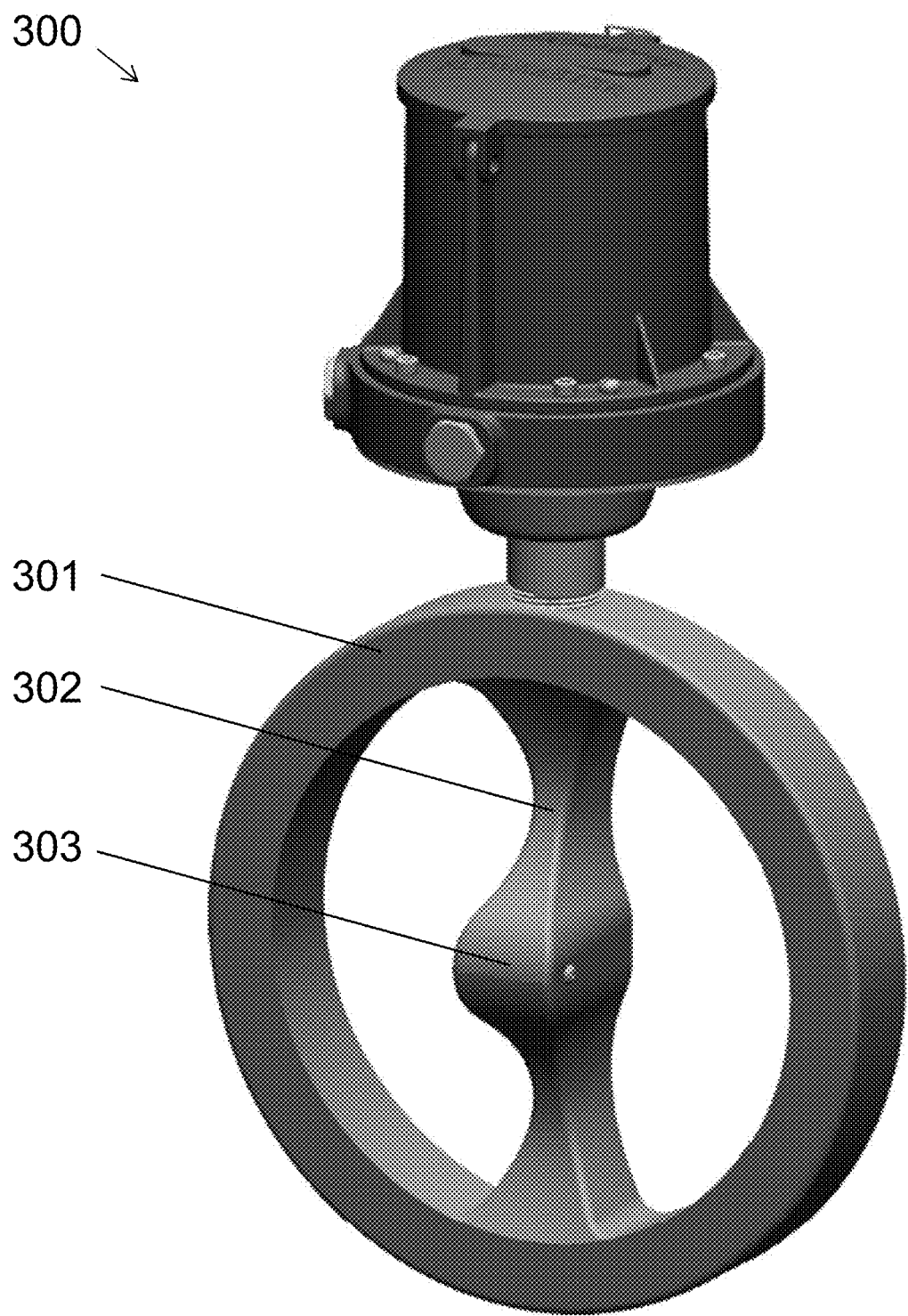
FIG. 3 illustrates a further example embodiment of a distal end of a magnetic flow sensor.

Referring to FIG. 3, an example embodiment for a magnetic flow sensor distal end 300 is illustrated. For example, the embodiment of FIG. 3 may be an alternative to the example embodiment illustrated in FIG. 1. In other words, the section of conduit may be shaped to accommodate a different shape of a magnetic flow sensor distal end. In an embodiment a conduit may not be required as a distal portion of the magnetic flow sensor may be threaded or otherwise connected to the external portion. Returning to FIG. 3, the distal end may be referred to as a wafer shape. The overall shape of the distal end resembles a simple "steering wheel." The wafer shape may have a circular portion 301 and a bisecting portion 302. Other shapes of the distal end or wafer shape may be used and the illustrated example represents an example embodiment. The distal end of the wafer shape 303 faces the upstream flow of a fluid. In an embodiment the distal end of the magnetic flow sensor is parallel with the flow path of the fluid. The wafer shape of the magnetic flow sensor may perform in a similar manner as described above. A fluid with conductive particles creates a magnetic field as the fluid passes a coil. Voltage or a voltage change may be measured and correlated to a fluid velocity.

The system and method may determine a proper volume, rate of delivery, flow, or the like. The system may have flow sensors, fluid level sensors, pressure sensors, or any sensor to determine a volume or rate of flow of a fluid. Additionally or alternatively, the magnetic flow sensor may be calibrated. For example, the system may be programmed that given certain parameters, such as flow rate, voltage, diameter of pipe, viscosity of fluid, or the like delivers a certain volume of a fluid. The parameters may include tubing diameter, fluid viscosity, a pump speed, or the like. The sensors may be located upstream, downstream, or within the magnetic flow sensor. The sensors may provide feedback to a system, valves, and/or a pump to regulate the delivery of a fluid. The system may also monitor and measure the flow of a plurality of piping and/or reservoirs that may deliver fluid.

Measurement of the delivery of a fluid may be at periodic intervals set by the user or preprogrammed frequencies in the device. A measurement of the delivery of a fluid may be an output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of a measurement or fluid delivery outside acceptable levels. An embodiment may use a system to shut down a pump or alter the pumping during periods of unacceptable parameters or thresholds. For example, a measuring device may use a relay coupled to an electrically actuated valve, pump, or the like.

If the fluid delivery is outside acceptable parameters, the system may take corrective action. For example, the system may provide an input to the system to increase speed, increase volume, increase pressure, or the like. In an embodiment, a pump may be switched to a faster pumping state to increase pressure, flow, volume, or the like. Additionally or alternatively, the system may take step to slow the flow of a fluid.

The system may output an alarm, log an event, or the like. An alert may be in a form of audio, visual, data, storing the data to a memory device, sending the output through a connected or wireless system, printing the output or the like. The system may log information such as the measurement location, a corrective action, geographical location, time, date, number of measurement cycles, rate of flow, volume of fluid, a log of the type of fluid being delivered, voltage, or the like. The alert or log may be automated, meaning the system may automatically output whether a correction was required or not. The system may also have associated alarms, limits, or predetermined thresholds. For example, if fluid delivery reaches or falls below a threshold or limit. Alarms or logs may be analyzed in real-time, stored for later use, or any combination thereof.

The various embodiments described herein thus represent a technical improvement to conventional magnetic flow sensors. Using the techniques as described herein, an embodiment may use a method and device for magnetic flow sensors. This is in contrast to conventional methods with limitations mentioned above. Such techniques provide a better method to construct and operate magnetic flow sensors.

Figure 4:
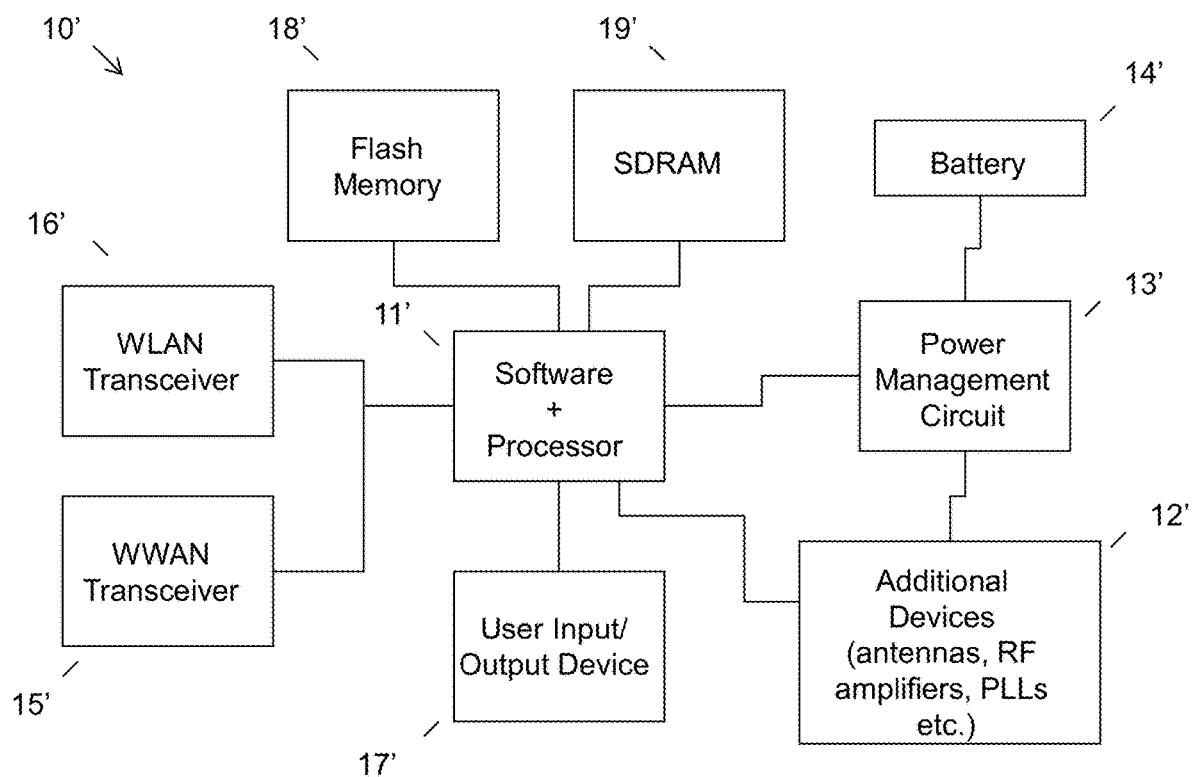
FIG. 4 illustrates an example of computer circuitry.

While various other circuits, circuitry or components may be utilized in information handling devices, with regard to a magnetic flow sensors according to any one of the various embodiments described herein, an example is illustrated in FIG. 4. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of a magnetic flow sensor.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring a flow of a fluid using a magnetic flow sensor, comprising:
   introducing a magnetic flow sensor into a fluid, wherein the fluid has a flow path, wherein the magnetic flow sensor comprises a coil and metallic field disrupter, wherein the coil has a longitudinal axis and the longitudinal axis is orthogonal to the flow path;
   positioning the magnetic flow sensor such that a distal end of the magnetic flow sensor is parallel with the flow path of the fluid; and measuring a flow of the fluid by measuring a voltage received from the magnetic flow sensor.

2. The method of claim 1, wherein the distal end of the magnetic flow sensor is positioned in an unobstructed flow upstream of a support structure.

3. The method of claim 1, wherein the magnetic flow sensor comprises a closed end tubular shape, wherein the coil is located in a distal end of the closed end tubular shape.

4. The method of claim 1, wherein the magnetic flow sensor comprises a wafer shape.

5. The method of claim 4, wherein the wafer shape comprises a circular portion and a bisecting portion.

6. The method of claim 1, wherein the magnetic flow sensor comprises a clamping unit.

7. The method of claim 1, wherein the metallic field disrupter comprises a mass of metal on each end of the longitudinal axis of the coil.

8. The method of claim 1, wherein the voltage is proportional to a velocity of the fluid.

9. The method of claim 1, wherein the voltage is produced by a magnetic field orthogonal to the flow path of the fluid, wherein the magnetic field is created by a plurality of conductive particles in the fluid.

10. A device for measuring a flow of a fluid using a magnetic flow sensor, comprising:
a magnetic flow sensor in a fluid, wherein the fluid has a flow path, wherein the magnetic flow sensor comprises a coil and a metallic field disrupter, wherein the magnetic flow sensor is positioned such that a distal end of the magnetic flow sensor is parallel with the flow path of the fluid, wherein the coil has a longitudinal axis and the longitudinal axis is orthogonal to the flow path;
a processor; and
a memory storing instructions executable by the processor to:
measure a flow of the fluid by measuring a voltage received from the magnetic flow sensor.

11. The device of claim 10, wherein the distal end of the magnetic flow sensor is positioned in an unobstructed flow upstream of a support structure.

12. The device of claim 10, wherein the magnetic flow sensor comprises a closed end tubular shape, wherein the coil is located in a distal end of the closed end tubular shape.

13. The device of claim 10, wherein the magnetic flow sensor comprises a wafer shape.

14. The device of claim 13, wherein the wafer shape comprises a circular portion and a bisecting portion.

15. The device of claim 10, wherein the magnetic flow sensor comprises a clamping unit.

16. The device of claim 10, wherein the metallic field disrupter comprises a mass of metal on each end of the longitudinal axis of the coil.

17. The device of claim 10, wherein the voltage is proportional to a velocity of the fluid.

18. A magnetic flow sensor device, comprising:
a magnetic flow sensor, wherein the magnetic flow sensor comprises a closed end tubular shape, wherein a coil is located in a distal end of the closed end tubular shape, wherein the coil has a longitudinal axis and the longitudinal axis is orthogonal to the flow path;
a metallic field disruptor, wherein the metallic field disrupter comprises a mass of metal on each end of the longitudinal axis of the coil;
wherein the magnetic flow sensor is utilized to measure a flow of a fluid the magnetic flow sensor is located within by measuring a voltage produced by the magnetic flow sensor, wherein the voltage is produced by a magnetic field orthogonal to the flow path of the fluid, wherein the magnetic field is created by a plurality of conductive particles in the fluid.

* * * * *